(12) United States Patent
Parellada Llobet et al.

(10) Patent No.: US 9,938,435 B2
(45) Date of Patent: Apr. 10, 2018

(54) ADHESIVE COMPOSITION

(71) Applicants: INSTITUT QUÍMIC DE SARRIÀ CETS FUNDACIÓ PRIVADA, Barcelona (ES); PJM PUJADAS, S.A., Rubí (ES)

(72) Inventors: Jorge Parellada Llobet, Barcelona (ES); Jordi Arbusá Amorós, Barcelona (ES); Salvador Borrós Gómez, Barcelona (ES)

(73) Assignees: INSTITUT QUIMIC DE SARRIA CETS FUNDACIO PRIVADA, Barcelona (ES); PJM PUJADAS, S.A., Rubí- Barcelona (ES)

( * ) Notice: Subject to any disclaimer, the term of this patent is extended or adjusted under 35 U.S.C. 154(b) by 151 days.

(21) Appl. No.: 14/353,771

(22) PCT Filed: Oct. 24, 2012

(86) PCT No.: PCT/IB2012/055842
§ 371 (c)(1),
(2) Date: Apr. 23, 2014

(87) PCT Pub. No.: WO2013/061255
PCT Pub. Date: May 2, 2013

(65) Prior Publication Data
US 2014/0290854 A1    Oct. 2, 2014

(30) Foreign Application Priority Data
Oct. 24, 2011   (ES) .................. 201131708

(51) Int. Cl.
*C09J 163/00* (2006.01)
*C09J 5/00* (2006.01)

(52) U.S. Cl.
CPC .............. *C09J 163/00* (2013.01); *C09J 5/00* (2013.01)

(58) Field of Classification Search
CPC .................................................. C09J 163/00
See application file for complete search history.

(56) References Cited

U.S. PATENT DOCUMENTS

| 3,891,583 | A |  | 6/1975 | Drisko |  |
|---|---|---|---|---|---|
| 2002/0164485 | A1 | * | 11/2002 | Martin | B32B 7/12 428/413 |
| 2005/0143496 | A1 |  | 6/2005 | Mueller |  |
| 2007/0191512 | A1 | * | 8/2007 | Bigorra Llosas | C08G 59/182 523/402 |
| 2010/0227949 | A1 | * | 9/2010 | Tamai | C08F 299/00 523/400 |
| 2011/0315916 | A1 | * | 12/2011 | Wilson | C08G 59/027 252/74 |

FOREIGN PATENT DOCUMENTS

| DE | 102005021051 A1 | 11/2006 |
|---|---|---|
| EP | 1921100 A1 | 5/2008 |
| EP | 1806375 B1 | 4/2009 |
| JP | S59191713 A | 10/1984 |
| JP | S6023467 A | 2/1985 |
| JP | 2000336333 A | 12/2000 |
| JP | 2006089658 A | 4/2006 |

OTHER PUBLICATIONS

International Search Report (ISR) and Written Opinion (ISA), International Application No. PCT/IB2012/055842 International dated Oct. 24, 2012, dated ISR Mar. 13, 2013, 11 pages, European Patent Office, Rijswijk Netherlands.

* cited by examiner

*Primary Examiner* — Kuo-Liang Peng
(74) *Attorney, Agent, or Firm* — Peter B. Scull; Hamilton, DeSanctis & Cha LLP

(57) ABSTRACT

The present invention relates to an adhesive composition comprising a component A and a component B, wherein said component A comprises bisphenol A resin; a hydrophilic solvent, preferably acetone or ethanol or mixtures thereof; and silica gel ($SiO_2$) or alumina ($Al_2O_3$) and said component B comprises aliphatic or aromatic polyamines, preferably polyamidoamines; polythiol; a combination of primary and tertiary amines, preferably 1-(2-aminoethyl)piperazine and ethylenediamine; optionally a hydrophilic solvent and optionally silica ($SiO_2$) or alumina ($Al_2O_3$) gel. Said composition has the advantage that it cures, in addition to under dry conditions, in the presence of water or humidity in a time of 30 minutes as much and is flexible. The present invention also relates to a process for obtaining said adhesive composition. The present invention also relates to the use of the adhesive composition of the present invention for the bonding of any type of material, both in a medium with the presence of water and without it, and of materials where a flexible behavior is necessary.

5 Claims, No Drawings

ADHESIVE COMPOSITION

FIELD OF THE INVENTION

The present invention relates to the field of adhesives.

BACKGROUND OF THE INVENTION

The importance of adhesives in the modern world is well known, both on an industrial and professional level. They are used in a multitude of manufacturing processes to perform bonds, for example, in sectors such as graphic arts, transformation of paper and cardboard, containers and packaging, furniture and wood, the car industry, etc. They are also very important in the installation or bonding of materials, especially in construction (adhesives for pavements and coverings such as carpets, PVC, linoleum, . . . ). Even on a domestic or children's level, their use is fairly widespread. Obviously due to this great variety of fields of application, their composition is quite variable. In this way, we can have adhesives of solid, liquid, acrylic types, cyanoacrylates, epoxy, etc.

On a technical level, an adhesive is defined as a mixture of substances that serves to keep two supports bonded together by surface interactions. These interactions may be of physical or chemical type (chemical bonds). The bonding mechanism of an adhesive is based on a balance of two forces:

Adhesive force (Fa): the force that must be exerted to separate the adhesive from the surface.

Cohesive force (Fc): the force that must be exerted to break the internal structure of the adhesive.

A good adhesive is characterized in that it causes ruptures of cohesive type, i.e. the adhesive must break before separating from the support. In some cases it may be of interest that ruptures of the support appear (for structural adhesives).

A cohesive rupture is characterized as it appears in a system wherein Fc<Fa.

This can be achieved by adhesives with low Fc: low resistance bonds or by systems providing very high Fa (incorporating adherence promoters, for example).

However, one of the current difficulties is finding adhesives capable of curing when the place where they are applied is in contact with high humidity or directly in contact with water and that, furthermore, said curing is performed in the shortest possible period of time. This is of great importance when the working conditions are usually surrounded by an aqueous medium, such as, for example, in a boat, in the repair of submerged pipes, applications in plumbing, nautical construction and repairs, or, in general, any utensil which, due to its characteristics, must be in continuous contact with water and it is required that the adhesive acts as fast as possible.

Currently, there are adhesive compositions that are used for curing in said aqueous conditions but their efficacy is far from optimum. Examples of said commercial products are the Marine Adhesive fast cure 5200™ from 3 M™, or Hysol U-05FL™ from Loctite™.

Document JP2000336333 discloses a water-resistant adhesive comprising two components A and B, where component A is an epoxy resin composition modified with urethane, bisphenol A resin and acrylic particles and component B is a polyamidoamine.

Document JPS6023467 relates to an adhesive with excellent water resistance properties and is composed of formaldehyde, bisphenol A-type epoxy resin and optionally an epoxy resin hardener such as, for example, compounds with amino groups.

Document JPS59191713 discloses the use of an epoxy resin mixture derived from bisphenol A and polyamidoamine in a composition with iron oxide and a fibrous material to obtain a material with great adhesiveness to metals, wood and good resistance in water.

The present inventors have surprisingly obtained an adhesive composition with the capacity of curing, in addition to under dry conditions, under humid conditions or submerged in water (being this water, for example, pure water, fresh water, salt water, sea water, ocean water, contaminated water, and, in general, solutions where the major solvent is water) in a period of time of 30 min as much, with the capacity of bonding any type of material, whether in dry or humid conditions or submerged in water, and additionally having a flexible behaviour once cured which makes it especially indicated for demands where a flexible bond is required and with variability in form. All these properties are kept even at temperatures around 5° C.

None of the previously mentioned documents disclose an adhesive composition as disclosed in the present invention having at the same time all the above disclosed properties.

Consequently, a first object of the present invention is to achieve an adhesive composition which has the capacity to cure, in addition to under dry conditions, in an aqueous medium (i.e. submerged in water, considering that this water can be, for example, pure water, fresh water, salt water, sea water, ocean water, contaminated water, and, in general, solutions where the major solvent is water) or with humidity in the shortest possible time (30 min as much) and also be flexible, this last parameter being easily controllable by the modification of the adhesive composition.

Another object of the present invention is to develop a process whereby the adhesive composition described herein is obtained.

Another further object of the present invention is to provide the use of the adhesive composition of the present invention to bond any type of surface in any environmental condition, whether with water or without it.

BRIEF DESCRIPTION OF THE INVENTION

The present invention firstly relates to an adhesive composition comprising a component A and a component B, wherein said component A comprises bisphenol A epoxy resin; a hydrophilic solvent, preferably acetone or ethanol or mixtures thereof; and silica ($SiO_2$) or alumina ($Al_2O_3$) gel and said component B comprises aliphatic or aromatic polyamines, preferably polyamidoamines; polythiol; a combination of primary and tertiary amines, preferably 1-(2-aminoethyl)piperazine and ethylenediamine; optionally a hydrophilic solvent and optionally silica ($SiO_2$) or alumina ($Al_2O_3$) gel. Said composition has the advantage that it cures, in addition to under dry conditions, in the presence of water or humidity or submerged in water, considering that this water can be, for example, pure water, fresh water, salt water, sea water, ocean water, contaminated water, and, in general, solutions where the major solvent is water, in a time of 30 minutes as much and is flexible. Additionally, the degree of flexibility can be easily controlled by the modification of the adhesive composition.

The present invention also relates to a process for obtaining said adhesive composition.

Finally, the present invention also relates to the use of the adhesive composition of the present invention for the bonding of any type of material in a medium with the presence of water and without it, and of materials where a flexible behaviour is necessary.

DETAILED DESCRIPTION OF THE INVENTION

The present invention relates in a first aspect to an adhesive composition comprising a component A and a component B, wherein said component A comprises:
bisphenol A epoxy resin;
a hydrophilic solvent, preferably acetone or ethanol or mixtures thereof; and
silica ($SiO_2$) or alumina ($Al_2O_3$) gel
and said component B comprises:
aliphatic or aromatic polyamines, preferably polyamidoamines;
polythiol;
a combination of primary and tertiary amines, preferably 1-(2-aminoethyl)piperazine and ethylenediamine;
optionally a hydrophilic solvent; and
optionally silica ($SiO_2$) or alumina ($Al_2O_3$) gel.

As indicated above, the component hydrophilic solvent can be optionally present in the formulation of component B.

As indicated above, the component silica ($SiO_2$) or alumina ($Al_2O_3$) gel can be optionally present in the formulation of component B.

As indicated above, the component hydrophilic solvent and the component silica ($SiO_2$) or alumina ($Al_2O_3$) gel can be both optionally present together in the formulation of component B.

Said composition has the advantage that it cures, in addition to under dry conditions, in the presence of humidity or submerged in water in a time of 30 minutes as much and is flexible.

By "submerged in water" is understood in the present invention that the components to be cured are in contact with water, being this water pure water, fresh water, salt water, sea water, ocean water, contaminated water, and, in general, solutions where the major solvent is water.

The bisphenol A epoxy resin used in the present invention preferably has an number average molecular weight lower than 700 (Wn<700).

Throughout the present invention, previously and subsequently, "flexibility" is understood when applied to a material or that a material is "flexible" a material which has a high deformation in the elastic limit.

In the present invention "hydrophilic solvent" is understood as any solvent which has the capacity of being partially or totally dissolved in water. Preferably, acetone or ethanol is used. This component provides the capacity of curing under water submerging conditions without altering the curing rate, the flexibility and the adhesiveness capacity.

In a preferred embodiment, each compound of component A has the following concentrations: bisphenol A epoxy resin between 35 and 45% by weight, hydrophilic solvent between 10 and 15% by weight and $SiO_2$ or $Al_2O_3$ between 10 and 15% by weight over the total composition and each compound of component B has the following concentrations: aliphatic or aromatic polyamines between 30 and 40% by weight, polythiol between 3 and 4.5% by weight, combination of primary and tertiary amines between 0.5 and 2.5% by weight over the total composition.

The polythiol used in the present invention is preferably a polythiol of high molecular weight. The greater this molecular weight, the greater flexibility will be achieved in the final adhesive composition.

In a particular embodiment, this composition additionally has a great flexibility which has experimentally been demonstrated that it corresponds to a deformation between 3 and 5% on applying a load between 2.5 and 9 N, respectively.

In a particular embodiment, the present composition may further comprise, whether with component A or with component B, one or more additional components selected from the group consisting of: at least one ultraviolet light stabilizer (for example, tinuvin type), metal powder, optionally nanometric, to achieve an adhesive conductor, at least one antifungal agent such as, for example, copper salts, preferably in 0.5% by weight, at least one antioxidant (for example, BHT type), at least one water-miscible organic solvent (for example, ethylene glycols, alcohols), at least one viscosity-regulator agent and at least one thixotropic agent, or mixtures thereof.

The adhesive composition of the present invention, according to any of the embodiments disclosed herein, has the following properties:
Curing under dry or humid conditions or submerged in water in a time of 30 minutes as much
Great flexibility once cured
Capacity of bonding any type of material, whether in dry or humid conditions or submerged in water
Invariability of the above properties at low temperatures (even at temperatures around 5° C.)

In a second aspect, the present invention relates to a process for obtaining an adhesive composition disclosed in the present invention according to any of the previous embodiments comprising the initial mixture of the components of B, also optionally with the components of A with the exception of the bisphenol A epoxy resin, and the subsequent mixture of the bisphenol A epoxy resin with the initial mixture if it already contains the remaining components of A or with the initial mixture and the remaining components of A if the initial mixture of the components of B was not mixed with the components of A.

The objective of making the mixture separately of the bisphenol A epoxy resin and the components of B is to prevent the start of the curing reaction, being it possible to add both the silica or alumina gel and the hydrophilic solvent in both components, in order to adjust to a suitable stoichiometric proportion depending on the final properties desired for the adhesive.

A third aspect of the present invention relates to the use of the adhesive composition disclosed in the present invention according to any of the previous embodiments wherein the materials to be bonded by said adhesive composition are for example, but without being limited thereto, wood, metals, ceramics, polymerics or materials composed with mixtures of said materials.

In a particular embodiment, said materials have water in any of their physical states on their surface.

In another particular embodiment, said materials have no water in any of their physical states on their surface.

In another particular embodiment, said materials are submerged in water, being this water, pure water, fresh water, salt water, sea water, ocean water, contaminated water, and, in general, solutions where the major solvent is water.

In a preferred embodiment, the adhesive composition disclosed in the present invention according to any of the previous embodiments is used to bond materials, such as, but without being limited thereto, wood, metals, ceramics, polymerics or materials composed with mixtures of said materials, wherein the bonding zone between the composition and the surface of the material requires a flexible behaviour or with mobility.

EXAMPLES

The following examples of compositions are provided to explain and illustrate the present invention and are not intended to be limiting thereof. All the percentages relate to % by weight.

For a faster reading, the following abbreviations have been used:

Bisphenol A epoxy Resin (Wn<700)=BPAR
High molecular weight polythiol=DAP
1-(2-Aminoethyl)piperazine=APZ
Ethylenediamine=EDA
Composition 1:
4 parts of BPAR (41%)
3 parts of Polyamidoamine (31%)
0.3 parts of DAP (3%)
0.1 parts of APZ (1%)
0.1 parts of EDA (1%)
1.125 parts of Acetone (11.5%)
1.125 parts of silica gel (11.5%)

This composition has a curing time of 25 minutes. The final appearance of the adhesive is flexible, it has an excellent behaviour against curing in the presence of or submerging in water (pure water, fresh water, salt water, sea water, ocean water, contaminated water, and, in general, solutions where the major solvent is water). The same properties were obtained at 10° C., room temperature and 45° C.

Composition 2:
4 parts of BPAR (41%)
3 parts of Polyamidoamine (31%)
0.4 parts of DAP (4%)
0.05 parts of APZ (0.5%)
0.05 parts of EDA (0.5%)
1.125 parts of Acetone (11.5%)
1.125 parts of silica gel (11.5%)

This composition has a curing time of 30 minutes. The final appearance of the adhesive is very flexible and has a very good behaviour against curing in the presence of or submerging in water (pure water, fresh water, salt water, sea water, ocean water, contaminated water, and, in general, solutions where the major solvent is water). The same properties were obtained at 10° C., room temperature and 45° C.

Comparative Composition 3:
4 parts of BPAR (41%)
3 parts of Polyamidoamine (31%)
0.5 parts of DAP (5%)
1.125 parts of Acetone (11.5%)
1.125 parts of silica gel (11.5%)

This composition has a curing time close to 80 minutes.

Comparative Composition 4:
4 parts of BPAR (41%)
3 parts of Polyamidoamine (31%)
0.25 parts of APZ (2.5%)
0.25 parts of EDA (2.5%)
1.125 parts of Acetone (11.5%)
1.125 parts of silica gel (11.5%)

Comparative Composition 5:
4 parts of BPAR (53.34%)
3 parts of Polyamidoamine (40%)
0.3 parts of DAP (4%)
0.1 parts of APZ (1.33%)
0.1 parts of EDA (1.33%)

This composition has a curing time of 20 minutes, however it does not have the capacity to cure correctly in the presence of water.

The invention claimed is:

1. Adhesive composition consisting essentially of a component A and a component B,
and, optionally, one or more additional components either in component A or in component B selected from the group consisting of: at least one ultraviolet light stabilizer, metal powder, at least one antioxidant, at least one antifungal agent, at least one water-miscible organic solvent, at least one viscosity-regulator agent and at least one thixotropic agent or mixtures thereof;
wherein
said component A consists essentially of:
bisphenol A epoxy resin;
a hydrophilic solvent;
silica ($SiO_2$) or alumina ($Al_2O_3$) gel; and
optionally the one or more additional components;
and said component B consists essentially of:
aliphatic or aromatic polyamines;
polythiol;
a combination of primary and tertiary amines;
optionally a hydrophilic solvent, and
optionally silica ($SiO_2$) or alumina ($Al_2O_3$) gel; and
optionally the one or more additional components;
wherein the hydrophilic solvent is acetone, ethanol or a mixture thereof;
wherein in component A: the bisphenol A epoxy resin is in a concentration between 35 and 45% by weight, the hydrophilic solvent is in a concentration between 10 and 15% by weight and the $SiO_2$ or $Al_2O_3$ are in a concentration between 10 and 15% by weight, of the total composition;
wherein the combination of primary and tertiary amines is 1-(2-aminoethyl)piperazine and ethylenediamine;
wherein the aliphatic or aromatic polyamines are polyamidoamines; and,
wherein in component B: the aliphatic or aromatic polyamines are in a concentration between 30 and 40% by weight, the polythiol is in a concentration between 3 and 4.5% by weight, and the combination of primary and tertiary amines is in a concentration between 0.5 and 2.5% by weight, over the total composition.

2. Process for obtaining the composition according to claim 1, comprising
initially mixing the components of B, also optionally with the components of A with the exception of the bisphenol A epoxy resin, and
subsequently mixing of the bisphenol A epoxy resin with the initial mixture if it already contains the remaining components of A or with the initial mixture and the remaining components of A if the initial mixture of the components of B was not mixed with the components of A.

3. A method of use of the composition according to claim 1, comprising
bonding at least two materials with the composition of claim 1;
wherein the materials to be bonded are wood, metals, ceramics, polymerics or materials composed with mixtures of said materials.

4. A method of use of the composition according to claim 3, wherein these materials have water in any of their physical states on their surface.

5. A method of use of the composition according to claim 3, wherein the bonding zone between the composition and the surface of the material requires a flexible behaviour or with mobility.

* * * * *